Patented Sept. 6, 1938

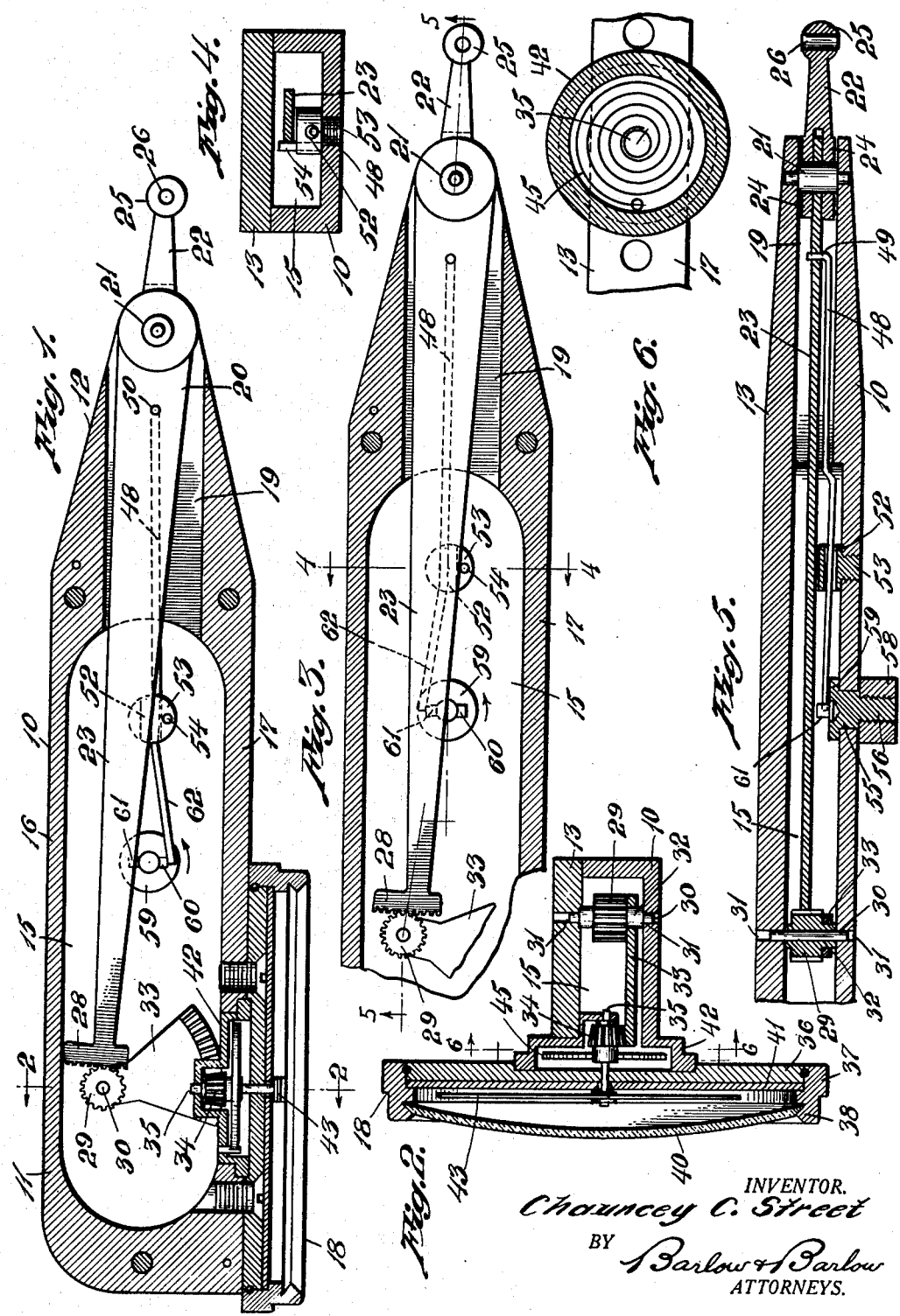

2,129,311

UNITED STATES PATENT OFFICE 2,129,311

DIAL TEST INDICATOR

Chauncey C. Street, Providence, R. I., assignor to Federal Products Corporation, a corporation of Rhode Island Application April 14, 1936, Serial No. 74,344

11 Claims. (Cl. 33—172)

This invention relates to dial test indicators, and more particularly to a dial test indicator of the type adapted to be used for testing and measuring the inaccuracies in cylindrical or plane surfaces for the purpose of indicating whether or not a surface is in an out-of-true condition, or to detect deviations from parallelism of two surfaces or out-of-roundness of a spindle or arbor; and has for an object to provide an improved and simplified indicator construction which is inexpensive to manufacture yet will provide accurate readings on the dial and is less likely to get out of order than the prior art devices heretofore constructed.

Another object of this invention is to provide motion transmitting means for actuating a dial gauge operating member of such a gauge whereby a small rectilinear movement of the work-engaging member thereof will be greatly multiplied at a high ratio during transmission to the gauge operating member and translated into a wide angular swing of the dial pointer.

Another object of this invention is to provide adjustable means for urging the motion transmitting member in a selected direction to return said motion transmitting member to its initial starting position.

Another object of this invention is to provide adjustable spring means independent from the pointer return device for urging the motion transmitting lever in a selected direction to return said lever to its starting position when the indicator is not in use, and in particular to provide a mounting for said spring which instead of being rigidly secured in position to the transmitting lever is loosely mounted with respect thereto so as to be capable of manual adjustment by the operator in order to direct its force to the transmitting member in the desired direction, to restore the same to its starting point.

With these and other objects in view as will be apparent from the following disclosure, the invention consists of certain novel features of construction, as will be more fully described and particularly pointed out in the appended claims.

In the accompanying drawing:

Fig. 1 is a longitudinal sectional view, on greatly enlarged scale, of a test indicator embodying my invention;

Fig. 2 is a transverse sectional view taken on the line 2—2 of Fig. 1;

Fig. 3 is a fragmental view of the bottom end of the instrument showing the spring member for urging the motion transmitting lever in the inverse direction from that shown in Fig. 1;

Fig. 4 is a transverse section taken on the line 4—4 of Fig. 3;

Fig. 5 is a longitudinal sectional view in elevation taken substantially on the line 5—5 of Fig. 3; and Fig. 6 is an enlarged cross-sectional view taken on the line 6—6 of Fig. 2 and showing the mounting arrangement of the spiral spring.

In the use of such test indicators of the prior art various difficulties have been encountered particularly in obtaining a sufficiently wide angular movement of the indicating pointer over the dial in response to a minute rectilinear movement of the work-engaging member which is in contact with the work surface being tested. Furthermore, in the test instruments of this type as heretofore constructed, a rigid mounting has been employed for rigidly securing the spring within the instrument case to return the operating lever to its starting position, and this spring has been of a non-adjustable character so that its action has been uni-directional and incapable of reversal when the swing of transmitting lever has taken place in the same direction. In such prior devices, pivoted levers have been utilized for multiplying the movement of the work-engaging member, but they have been limited in the magnitude of amplification which could be used owing to the small compass in which they were housed with the consequent reduction in angular swing of the indicating pointer of the gauge; and in order to accomplish these results in an improved and efficient manner I have provided means which, in my preferred embodiment of this invention, comprises sector gears and pinions, whereby the rectilinear movement of the work-engaging member is multiplied at a higher ratio than heretofore has been considered practicable to translate it into a wide angular movement of the indicating pointer over the dial; and in order to provide for rapid and efficient movement of the motion transmitting lever I preferably arrange this lever and its associated gears for movement in a plane at substantially right angles to the dial indicator with the transmission of motion in a right angular direction. To cause reversal of the transmitting lever from one or the other direction of its swing to return it to its starting position I have provided a pivoted means, such as a spring, which is adjustably mounted so that its force may be selectively applied to the motion transmitting lever in a direction opposed to its indicating movement to accomplish this result; and as a further feature of this invention, I have provided adjustable means cooperating with the pivoted spring whereby the direction of force applied by this spring to said lever may be reversed with respect to the indicating movement of the lever at will by the operator to act on the lever and return it in the desired direction to its starting point; and the following is a more detailed description of the present embodiment of this invention, illustrating the preferred means by which these advantageous results may be accomplished:

With reference to the drawing, 10 designates a hollow body plate member having an upper head portion 11 of generally rectangular shape and a tapering lower neck portion 12, the body member 10 having its front wall or cover 13 (see Figs. 4 and 5) removed providing a chamber 15 disposed between the side walls 16 and 17 of the body plate and in which the operating and motion transmitting mechanism of the present invention for actuating the dial indicator and hereafter to be described, is mounted. A dial indicator 18 is mounted upon the upper portion of the head member 11 and is secured to the side wall 17 thereof. The chamber 15 is closed at the end adjacent to the dial indicator but is open at its other end for communicating with a longitudinally extending elongated recess 19 formed in the tapered neck portion 12 of the body plate member, the recess 19 having its axis arranged substantially coincident with the axis of the chamber 15.

In this extended recess and chamber of the body plate member 10 is a lever 20 which is pivotally mounted on the body plate 10 and the front cover 13, respectively, at the lower end of the neck portion 12 by means of a pivot 21 for oscillatory movement therebetween and inside of said recess and chamber. The lever 20 consists of two arms 22 and 23 which are of unequal length and suitably connected by a friction fit for movement with the pivot 21. The arm 22 of the lever 20 is shorter than the other arm 23 and forms an extension or work-engaging arm which projects outwardly beyond the end of the tapered portion 12 of the body plate 10. The upper end of short arm 22 adjacent to the pivot 21 is bifurcated as by being slitted inwardly from its terminal end to form two spaced arms 24 which embrace and tightly grip the opposed side faces of the long arm 23 which is inserted in the slit in frictional tight engagement between the arms 24 so that the work-engaging arm 22 is securely held in the adjusted angular position to which it is set and the arms 22 and 23 must move together as a single unit lever 20 and with the turning of the pivot 21.

The outer end of the short arm 22 is provided with a suitably formed work-engaging portion 25 at its outer end having an opening 26 therein for the reception and attachment thereto of a suitable contact element for engaging the surface to be tested. The long arm 23 which is the operating arm of the lever 20 extends from the pivot 21 lengthwise of the recess 19 towards the head member 11 and projects into the chamber 15 thereof for a sufficient distance within its interior as to bring the outer end of the arm to a position in adjacency to the dial. The operating arm 23 is provided on its inner end with a gear segment portion 28 which meshes with a pinion 29 secured to a spindle 30. The spindle 30 is rotatably mounted in bearings 31 in the body plate 10 and the cover member 13, respectively; and fixedly mounted on a hub portion 32 of the pinion 29 is a gear segment 33 which meshes with a pinion 34 mounted on the rearwardly projecting end of the dial pointer operating spindle 35 by which the movement of the lever 20 is transmitted through the internal operating mechanism of the indicator and translated into angular movement of the pointer relative to the dial to indicate in thousandths or other selected unit of measurement the precise amount of error of the surface being tested.

The dial indicator device 18 may be of any well-known and standard construction, but as illustrated in the drawing it comprises a dial plate 36 having a bezel ring 37 fixedly secured to the outer periphery of the dial plate and the ring has at its front end an inwardly extending flange 38 formed on its inner periphery adapted for mounting of the indicator crystal 40. A graduated dial 41 of thin sheet material is fixed to the outer face of the dial plate 36. The spindle 35 of the dial indicator is rotatably mounted at its inner end in a circular cup member 42 and projects through the dial 41 with a pointer 43 secured to its projecting upper end outside of the dial. The cup member 42 houses a spiral hair spring 45 which is connected at one end with the cup and at the other end with the spindle 35 to act on the spindle to turn it in a counter-clockwise direction and rotate the pointer 43 to the initial datum point or zero mark on the dial after it has been angularly shifted by the action of the operating lever 20 to indicate the extent of the test measurement.

In order to provide a constant pressure on the operating arm 23 of the lever 20 and also to permit an adjustment of the direction of such pressure at will by the operator whereby it may be directed to urge the lever in one direction or have its action reversed to act in the opposite direction, as desired, to return the arm 23 to its original starting position and independently of the return movement of the pointer 43 to its zero point when the arm 22 is out of contact with the work surface to be tested, I have provided a wire spring 48 having a laterally bent end 49 which extends into a hole 50 adjacent to the pivot 21 in the operating arm 23 of the lever 20, and from this pivot point the arm portion of the spring 48 extends longitudinally in the general direction of the head portion 11 of the body member 10 and disposed beneath the arm 23 and along the recess 19 into the chamber 15, said arm portion of the spring 48 slidably passing through an opening 52 which is of greater width than the thickness of the spring wire and formed in a stud 53 fixedly secured to the body plate 10. A stop pin 54 fixed in the head portion of the stud 53 serves to limit the swinging movement of the lever 20 inwardly of the chamber 15 while the outer side wall 16 of the case 10 acts as an abutment against which the outer end of the gear segment 28 strikes upon its outward swinging movement.

In order to reverse or change the positions at which the effect or force of the spring action of the spring 48 is applied to the arm 23 for urging it in the direction desired to insure its return to the initial point, I have provided an operating pin 55 of stepped formation swivelly mounted in the body plate 10 and having a reduced end portion 56 which projects outwardly beyond the rear face of the body plate 10 and is externally threaded by which agency a thumb nut 58 is securely mounted and fastened thereon. The inner end of the operating pin 55 is provided with a circular flange 59 on the end face of which is mounted a pair of diametrically opposed spaced upright pins 60 and 61, respectively, against one of which the end portion 62 of the spring 48 is successively held, as illustrated in Figs. 1 and 3, respectively. With this particular arrangement, the spring end portion 62 is flexed from side to side about the stud 53 as a fulcrum point upon manual turning of the swivel pin 55 by the operator. Thus, it will be apparent that the turning of the pin 55 through a half revolution in a counter-clockwise direction, as indicated by the arrow in Fig. 1, causes the pin 60 to move upwardly in the arc of a circle to take the position previously occupied by the opposite pin 61, during which movement the end portion 62 of the spring is displaced in the opening 52 of the stud 53 and the terminal end of the spring portion 62 is moved into the space between the upstanding pins 60 and 61. Upon further manual rotation of the pin 55 through an additional half revolution and continued in the same direction as before, the pins 60 and 61 will again exchange positions and be returned back to their original places, during which movement they will have made a whole revolution about the stud axis. In the course of this latter half turn, the pin 61 will be moved upwardly in an arc of a circle to contact with the underside of the spring portion 62 to lift the same to the position shown in Fig. 3 and flex the spring in the opposite direction while the pin 60 at the same time travels downwardly in an arc to return back to its initial starting point. Also, the spring portion 62 will be permanently held in a flexed position in engagement with one of the flexing pins 60 and 61, respectively, thus dispensing with the need of a separate device to hold it in the proper flexed position.

The operation of the device will now be apparent in view of the foregoing description: The operator first adjusts the position of the short lever arm 22 to the proper angular relation with respect to the long arm 23 by manually turning it to the desired position about the friction joint on the pivot 21 for engagement with the surface to be tested. The frictional pressure exerted by the short arm 22 on the long arm 23 should be such as will hold the two arms in operative engagement for unitary movement as the single lever arm 20 yet will permit the arm 22 to be displaced angularly relative to the long arm 23 for adjustment to the desired indicating position. Upon bringing the work-engaging portion 25 into contact with the work surface, the lever arm 22 will be moved to turn the pivot 21 in its bearings, and since the two arms 22 and 23 are frictionally connected with the pivot 21 of the lever 20 and will be moved together with the pivot. It is to be further understood that the arms 22 and 23 are proportioned of such length that any slight movement of the outer end portion 25 of the arm 22 will be greatly amplified by a large angular swinging movement of the arm 23 so that the gear segment 28 which engages the pinion 29 turns the same, thereby swinging the gear segment 33 and turning the spindle 35 of the dial indicator 18 and consequently the pointer 43 through an arc of considerable amplitude. The transmitting lever return spring 48 is flexed in the proper direction by regulation of the operating pin 55 to urge the transmitting lever in preferably the opposite direction to the majority of its indicating movements to return it promptly to its starting position. The spring 48 is considerably stronger than the pointer hair-spring 45 whose effect is therefore negligible on the action of the spring 48 when the latter is adjusted relative to the transmitting lever 20 to apply strong pressure thereto in either direction to bring said lever back to its original starting position.

In accordance with my invention, I have thus provided an improved test indicator which is not only simple and practical in construction but is highly efficient and accurate in its operation, and by its use the measurement of the surface being tested is indicated with precision and minute movements of the work-engaging member by a substantially multiplied swing of the pointer over the dial.

It will be noted that this arrangement of the motion transmitting lever 20, pinion 29 and the sector gears 28 and 33 provides for movement of the mechanism is substantially the same plane, and that the motion is transmitted in a plane which is generally at right angles to the dial indicator. Thus, the construction enables the transmission of motion easily at right angles or around corners for the selection of the most desirable position for the dial gauge. Also, the use of gearing has the advantage of providing a motion transmitting mechanism which is both simple and inexpensive yet will allow a greater latitude of movement and a higher degree of efficiency and more positive than any of the usual commercial types of indicator heretofore constructed.

The foregoing description is directed towards the construction illustrated, but I desire it to be understood that I reverse the privilege of resorting to all the mechanical changes to which the device is susceptible, the invention being defined and limited only by the terms of the appended claims.

I claim:

1. A test indicator comprising a body member provided with a recess, a dial gauge mounted on said body member having an operating spindle projecting into said recess, an oscillatable motion transmitting lever mounted in said body member and having a pair of arms of unequal length, the shorter of which projects outwardly beyond the end of said body member to form a work-engaging arm while the long arm is arranged within said recess and connected in driving engagement with said spindle for turning the same, and a reversing spring having a longitudinally extending arm portion one end of which is loosely connected to said lever to apply force thereto for urging said lever in a direction opposite from that taken during its indicating swinging movement, a fulcrum member loosely carrying an intermediate portion of said spring arm, the other end of said spring arm being arranged for flexing in two oppositely selected positions to apply its force to said lever, and means swivelly mounted in said body member to adjust said spring to one or the other of said selected positions to flex said spring about said fulcrum and against the indicating movement of said lever to return the latter to its initial starting position.

2. A test indicator comprising an elongated body member provided with a recess, a dial gauge mounted on said body member having an operating spindle projecting into said recess, an oscillatable motion transmitting lever pivotally mounted in said body member near an end thereof and having a pair of arms of unequal length, the shorter of which projects outwardly beyond the end of said body member to form a work-engaging arm while the long arm is arranged within said recess and connected in driving engagement with said spindle for turning the same, a reversing spring having a longitudinally extending arm portion one end of which is loosely connected to said lever to apply force thereto for urging said lever in a direction opposite from that taken during its indicating swinging movement, a fulcrum member loosely carrying an intermediate portion of said spring arm the other end of said spring arm being arranged for flexing in two oppositely selected positions to apply its force to said lever, and swivel means to adjust said spring to one or the other of said selected positions to flex said spring about said fulcrum and against the indicating movement of said lever to return the latter to its initial starting position, said fulcrum member being interposed between said swivel means and said pivot for the lever.

3. In a dial test indicator, the combination of a slender body plate member having a head portion of generally rectangular shape and recessed chambered portion in one face, a removable cover plate for closing the front side of said recess, a dial gauge mounted on the slender portion of said body member and having an operating spindle on the rear portion of which is mounted a pinion arranged to project into said recess, a spindle movably mounted on the body plate and disposed at right angles to said gauge spindle for rotation within said recess, said body plate spindle having a pinion and a gear segment mounted thereon in which said gear segment is in driving engagement with said gauge operating pinion, a lever pivoted at one end of said body plate and having two arms of unequal length, the shorter one of which projects outwardly beyond the body plate and is adapted for contact with the surface to be tested, while the longer arm of said lever extends lengthwise of said body plate and projects into said chamber of the body plate member, a gear segment provided at the free end of said long arm and in driving engagement with said body plate spindle pinion, and a spring arm fulcrumed at a point intermediate of its ends about which the spring is flexed to a position to oppose the oscillating movement of the lever and return the latter to its initial starting position.

4. In a test indicator, a body member, an oscillatable motion-transmitting lever pivotally mounted thereon and operatively connected to a movable pointer, said lever having a work engaging arm, a spring connected at one end to said lever and having a longitudinally extending arm portion capable of being flexed in several positions, a fulcrum member fixed to said body member movably carrying said spring arm and against which the latter has engagement when in a flexed position, and a swivel member journaled in said body member and arranged for flexing the arm portion of said spring about said fulcrum to position said spring arm so that its action will be applied to the motion-transmitting lever to urge the latter in a direction opposite to its oscillating movement and return the same to its initial starting position.

5. In a test indicator, a body member, an oscillatable motion-transmitting lever pivotally mounted thereon and operatively connected to a movable pointer, said lever having a work engaging arm, a spring connected at one end to said lever and having a longitudinally extending arm portion capable of being flexed in several positions, a fulcrum member fixed to said body member movably carrying the intermediate portion of said spring arm and against which the latter has engagement when in a flexed position, and a swivel member journaled in said body member and arranged to engage the free end of said spring arm for flexing said arm portion of said spring about said fulcrum to position said spring arm so that its action will be applied to the motion-transmitting lever to urge the later in a direction opposite to its oscillating movement and return the same to its initial starting position.

6. In a test indicator, a body member, an oscillatable motion-transmitting lever pivotally mounted thereon and operatively connected to a movable pointer, said lever being provided with an opening near its pivot and having a work engaging arm, a spring having a laterally bent end extending into said opening and a longitudinally extending arm portion, a fulcrum member fixed to said body member, means carried by said fulcrum member providing a movable mounting for said spring arm portion, and a swivel member journaled in said body member and arranged for flexing the arm portion of said spring about said fulcrum to position said spring arm so that its action will be applied to the motion-transmitting lever to urge the latter in a direction opposite to its oscillating movement and return the same to its initial starting position.

7. In a test indicator, a body member, an oscillatable motion-transmitting lever pivotally mounted thereon and having two frictionally connected arms of unequal length, the shorter one of which projects outwardly from the pivot and beyond said body member and forms a work engaging arm while the long arm extends inside of said body member and operatively connected to a movable pointer, the long arm of said lever being provided with an opening near its pivot and having a work-engaging arm, a spring having a laterally bent end extending into said opening and a longitudinally extending arm portion, a fulcrum member fixed to said body member, means carried by said fulcrum member providing a movable mounting for said spring arm portion, and a swivel member journaled in said body member and arranged for flexing the arm portion of said spring about said fulcrum to position said spring arm so that its action will be applied to the motion-transmitting lever to urge the latter in a direction opposite to its oscillating movement and return the same to its initial starting position.

8. In a test indicator, a body member, an oscillatable motion-transmitting lever pivotally mounted thereon and operatively connected to a movable pointer, said lever being provided with an opening near its pivot and having a work-engaging arm, a spring having a laterally bent end extending into said opening and a longitudinally extending arm portion, a fulcrum member fixed to said body member and having an enlarged opening extending laterally therethrough for providing a movable mounting for said spring arm, and a swivel member journaled in said body member and arranged for flexing the arm portion of said spring about said fulcrum to position said spring arm so that its action will be applied to the motion-transmitting lever to urge the latter in a direction opposite to its oscillating movement to cause its return to its initial starting position.

9. In a test indicator, a body member, an oscillatable motion-transmitting lever pivotally mounted thereon and operatively connected to a movable pointer, said lever being provided with an opening near its pivot and having a work-engaging arm, a spring having a laterally bent end extending into said opening and a longitudinally extending arm portion, a fulcrum member fixed to said body member and having an enlarged opening extending laterally therethrough for providing a movable mounting for said spring arm, and a swivel stud journaled in said body member, said stud having an exterior operating member and provided interiorly with a flanged head portion on which are mounted a pair of diametrically opposed spaced upright pins, one of which is in engagement with the free end portion of said spring arm for flexing the arm portion of said spring about said fulcrum to position and hold said spring arm so that its action will be applied to the motion-transmitting lever to urge the latter in a direction opposite to its oscillating movement to cause its return to its initial starting position.

10. In a dial test indicator, a body member having a longitudinal recess, a dial gauge mounted exteriorly of said body member and secured to a side wall thereof in which position the operating spindle of the gauge extends into said recess in a direction transversely thereof, a pinion mounted on the extension of said gauge operating spindle, a spindle pivoted to said body member and disposed transversely of said recess at right angles to said gauge spindle extension, a pinion and a segment gear fixed together and mounted on said body spindle for movement about the axis thereof, said segment gear being in operative engagement with the pinion on the gauge spindle extension, and motion-transmitting mechanism comprising a lever pivoted at the extremity of said body member and terminating in a head portion comprising a segment gear which is in mesh with said body spindle pinion, said lever being arranged for swinging movement in a direction at right angles to the dial gauge and in generally the same plane as that containing the axis of said gauge operating spindle.

11. In a test indicator, a body member, an oscillatable motion-transmitting lever pivotally mounted thereon and operatively connected to a movable pointer, said lever having a work engaging arm, a spring connected at one end to said lever and having a longitudinally extending arm portion capable of being flexed in several positions, a fulcrum member mounted in said body member and together with said lever carrying said spring arm, a camming member journaled in said body member and located to engage said spring arm on the opposite side of said fulcrum member from its engagement with said lever for flexing the arm portion of said spring to position said spring arm so that its action will be applied to the motion-transmitting lever to urge the latter in a direction opposite to its oscillating movement and return the same to its initial starting position.

CHAUNCEY C. STREET.